(12) United States Patent
Taylor et al.

(10) Patent No.: US 8,158,001 B2
(45) Date of Patent: Apr. 17, 2012

(54) WAFER-SHAPED HOLLOW FIBER MODULE FOR IN-LINE USE IN A PIPING SYSTEM

(75) Inventors: Gareth P. Taylor, Indian Trail, NC (US); Amitava Sengupta, Charlotte, NC (US)

(73) Assignee: Celgard LLC, Charlotte, NC (US)

( * ) Notice: Subject to any disclaimer, the term of this patent is extended or adjusted under 35 U.S.C. 154(b) by 0 days.

(21) Appl. No.: 12/477,340

(22) Filed: Jun. 3, 2009

(65) Prior Publication Data

US 2009/0301967 A1    Dec. 10, 2009

Related U.S. Application Data

(60) Provisional application No. 61/059,054, filed on Jun. 5, 2008.

(51) Int. Cl.
*B01D 25/00* (2006.01)
*F16L 23/00* (2006.01)

(52) U.S. Cl. ... 210/637; 210/237; 210/249; 210/321.84; 210/335; 210/459; 285/412; 285/414; 285/415; 285/368; 138/89; 138/97; 138/178

(58) Field of Classification Search .......... 210/637, 210/331, 323.1, 500.23, 237, 249, 321.84, 210/335; 96/8, 10; 138/89, 97, 178; 285/1, 285/15, 18, 65, 149.1, 184, 189, 284.1, 335, 285/384, 386, 390, 294, 397, 399, 405, 417, 285/420
See application file for complete search history.

(56) References Cited

U.S. PATENT DOCUMENTS

| | | | |
|---|---|---|---|
| 4,959,152 A | 9/1990 | Nichols | |
| 4,961,760 A * | 10/1990 | Caskey et al. | 210/321.89 |
| 5,366,625 A | 11/1994 | Pedersen et al. | |
| 5,380,433 A * | 1/1995 | Etienne et al. | 210/321.79 |
| 5,779,897 A | 7/1998 | Kalthod et al. | |
| 7,520,925 B2 * | 4/2009 | Sisk et al. | 96/420 |
| 2006/0163140 A1 | 7/2006 | Taylor et al. | |
| 2007/0278145 A1 | 12/2007 | Taylor et al. | |

* cited by examiner

*Primary Examiner* — Krishnan S Menon
*Assistant Examiner* — Allison M Gionta
(74) *Attorney, Agent, or Firm* — Hammer & Associates, P.C.

(57) ABSTRACT

A wafer-shaped hollow fiber module adapted for in-line use in a piping system. The piping system may include two standard bolted flange connections, and at least one wafer-shaped hollow fiber module sealed between the two standard bolted flange connections. The wafer shaped hollow fiber module includes: a cylindrical housing having an open end and a closed end having a first sealing surface and an inlet port; at least one side port through the cylindrical housing; an end cap united to the open end having a second sealing surface and an outlet port.

13 Claims, 6 Drawing Sheets

WAFER-SHAPED HOLLOW FIBER MODULE FOR IN-LINE USE IN A PIPING SYSTEM

RELATED APPLICATION

This application claims the benefit of U.S. Provisional application Ser. No. 61/059,054 filed Jun. 5, 2008.

FIELD OF INVENTION

The instant application relates to hollow fiber modules, in particular, a wafer-shaped hollow fiber module for in-line use in a new or existing piping system and its method of manufacture.

BACKGROUND OF THE INVENTION

A hollow fiber membrane contactor may be used for many purposes, including but not limited to, removing entrained gases from liquids, debubbling liquids, filtering liquids, and adding a gas to a liquid. Membrane contactors may be used in many different applications, for example, a hollow fiber membrane contactor may be used for in-line pH adjustment of water.

Current designs for elongate, cylindrical hollow fiber membrane contactors include hollow fiber mats embedded in opposing annular rings of potting material where the ends of the hollow fiber members are open. These embedded mats are then inserted into an elongate, cylindrical housing along the major axis of the hollow fiber members to form the device. The current designs are effective but may have one or more issues or problems.

One problem that current designs may have is that the housing may not allow the module to be easily installed, replaced or maintained in-line with new or existing piping systems, like pipes, tubes, ducts, etc. Another problem that current designs may have is the amount of pressure drop associated with moving a fluid through the device.

At least one embodiment of the instant invention of a wafer-shaped hollow fiber module for in-line use in a new or existing piping system is designed to address one or more of these problems.

SUMMARY OF THE INVENTION

According with at least one embodiment of the instant invention includes a wafer shaped hollow fiber module for in-line use in a piping system. In this embodiment, the piping system includes two standard bolted flange connections, and at least one of the wafer-shaped hollow fiber modules sealed between the two standard bolted flange connections. In at least one embodiment, the wafer shaped hollow fiber module includes: a cylindrical housing having an open end and a closed end having a first sealing surface with an inlet port; at least one side port through the cylindrical housing; an end cap united to the open end having a second sealing surface with an outlet port; a stack of membrane mats within the cylindrical housing comprising a plurality of hollow fibers; a potting material bonding the membrane mats to each other and simultaneously bonding one end of the stack to the closed end of the cylindrical housing and bonding the other end of the stack to the end cap, thereby defining an internal chamber and at least one external chamber within the housing; and the inlet port and the outlet port being in communication with the internal chamber.

BRIEF DESCRIPTION OF THE DRAWINGS

For the purpose of illustrating the invention, there is shown in the drawings a form that may be presently preferred; it being understood, however, that this invention is not limited to the precise arrangements and instrumentalities shown.

DETAILED DESCRIPTION OF THE INVENTION

Figure 1:
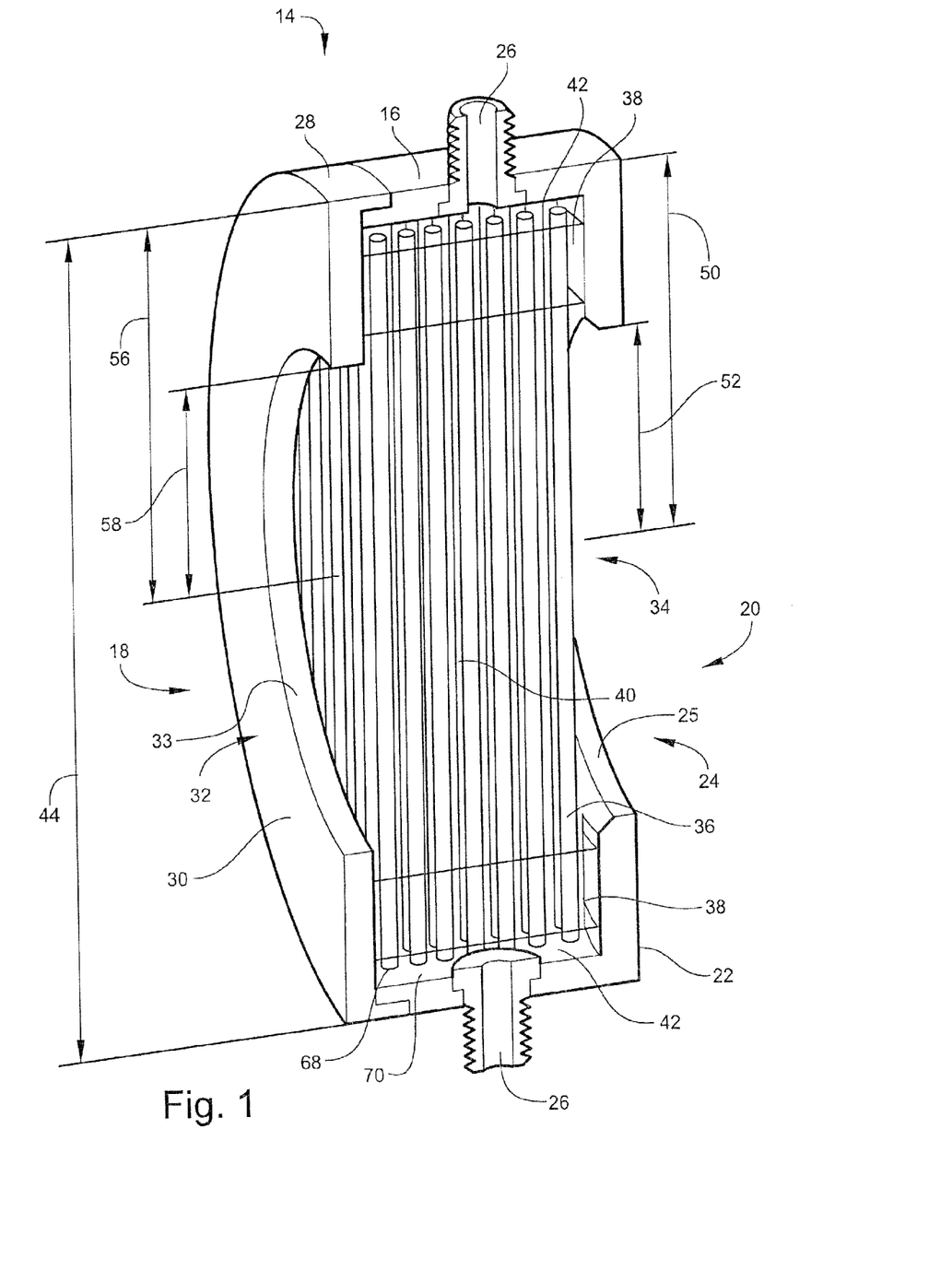
FIG. 1 is a cross-sectional perspective view of a wafer-shaped hollow fiber module according to at least one embodiment of the instant invention.
Figure 2:
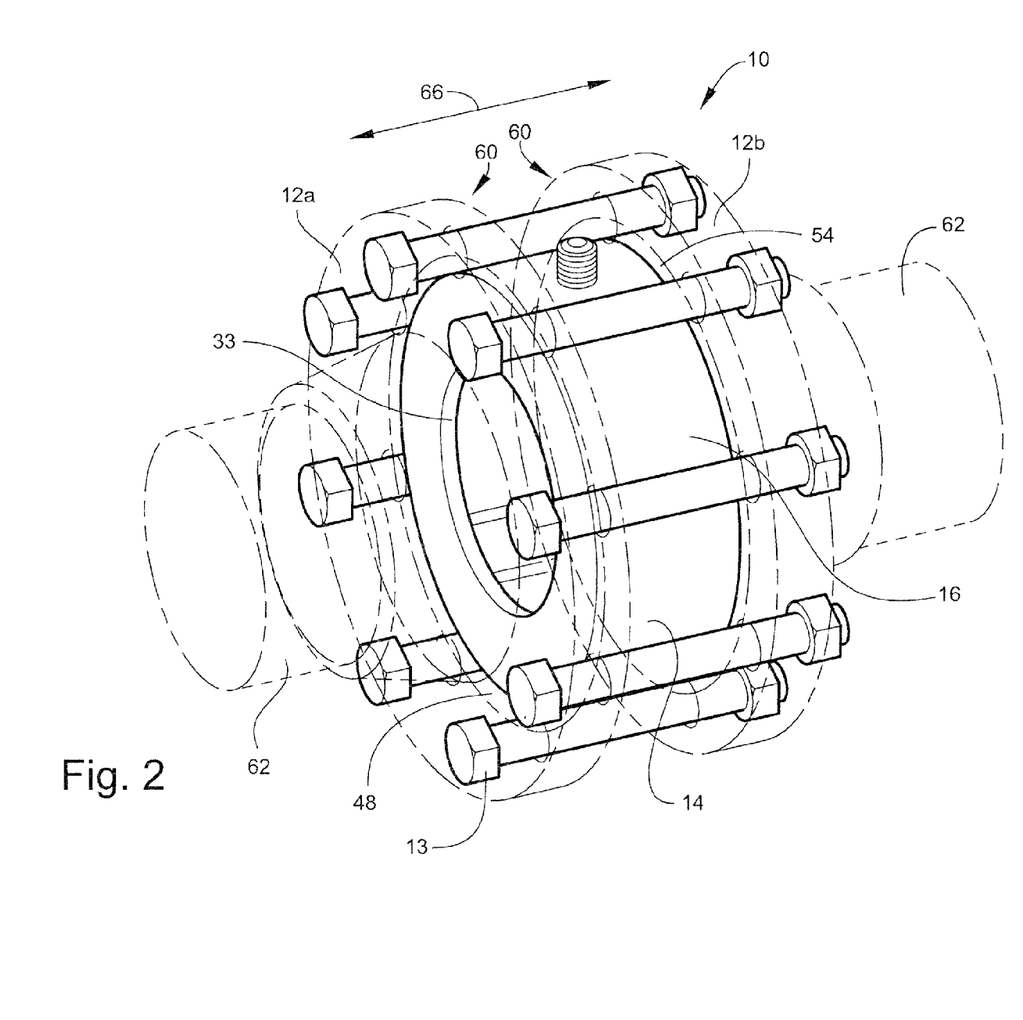
FIG. 2 is a perspective view of a piping system with the wafer-shaped hollow fiber module from FIG. 1 installed in-line.

Referring to the drawings, wherein like numerals indicate like elements, there is shown in FIG. 1 an embodiment of a wafer-shaped hollow fiber module 14. Wafer-shaped hollow fiber module 14 may be for providing a hollow fiber module for installation, replacement or to maintain in-line with a new or existing piping system 10, as shown in FIG. 2. Wafer-shaped hollow fiber module 14 may generally include a cylindrical housing 16, an end cap 28, a potting material 38 and a stack of membrane mats 34. It may be preferred that module 14 may include or may be made of recycled, natural, renewable, recyclable, biobased, or the like materials, that module 14 may be made to be easily recycled, for example, of separable components, and/or that the cylindrical housing 16 may be reusable, etc. The module may be adapted for commercial, industrial, institutional, residential, military, aerospace, aeronautic, maritime, municipal, and/or the like uses.

Cylindrical housing 16 may be included with wafer-shaped hollow fiber module 14. See FIG. 1. Cylindrical housing 16 may be for housing a stack of membrane mats 34. Cylindrical housing 16 may be any device for housing stack of membrane mats 34. Cylindrical housing 16 may be a generally wafer shaped housing with a closed end 20, an open end 18, and at least one side port 26. Cylindrical housing 16 may be sized to receive stack of membrane mats 34. Cylindrical housing 16 may have any internal shape, including, but not limited to, a circular internal shape, or a double "D" internal shape. A potting material 38 may divide cylindrical housing 16 into an internal chamber 40 and at least one external chamber 42. Cylindrical housing 16, side ports 26, and end cap 28 may be made of any material, including, metal, plastic, or composite. Preferably, cylindrical housing 16 may be a molded piece. Cylindrical housing 16, side ports 26, and end cap 28 may, for example, be fabricated from a rigid material, such as acrylonitrile butadiene styrene ("ABS") or polycarbonate. Cylindrical housing 16 may have a housing diameter 44 defined by the distance from the center to its outer edge.

Figure 3:
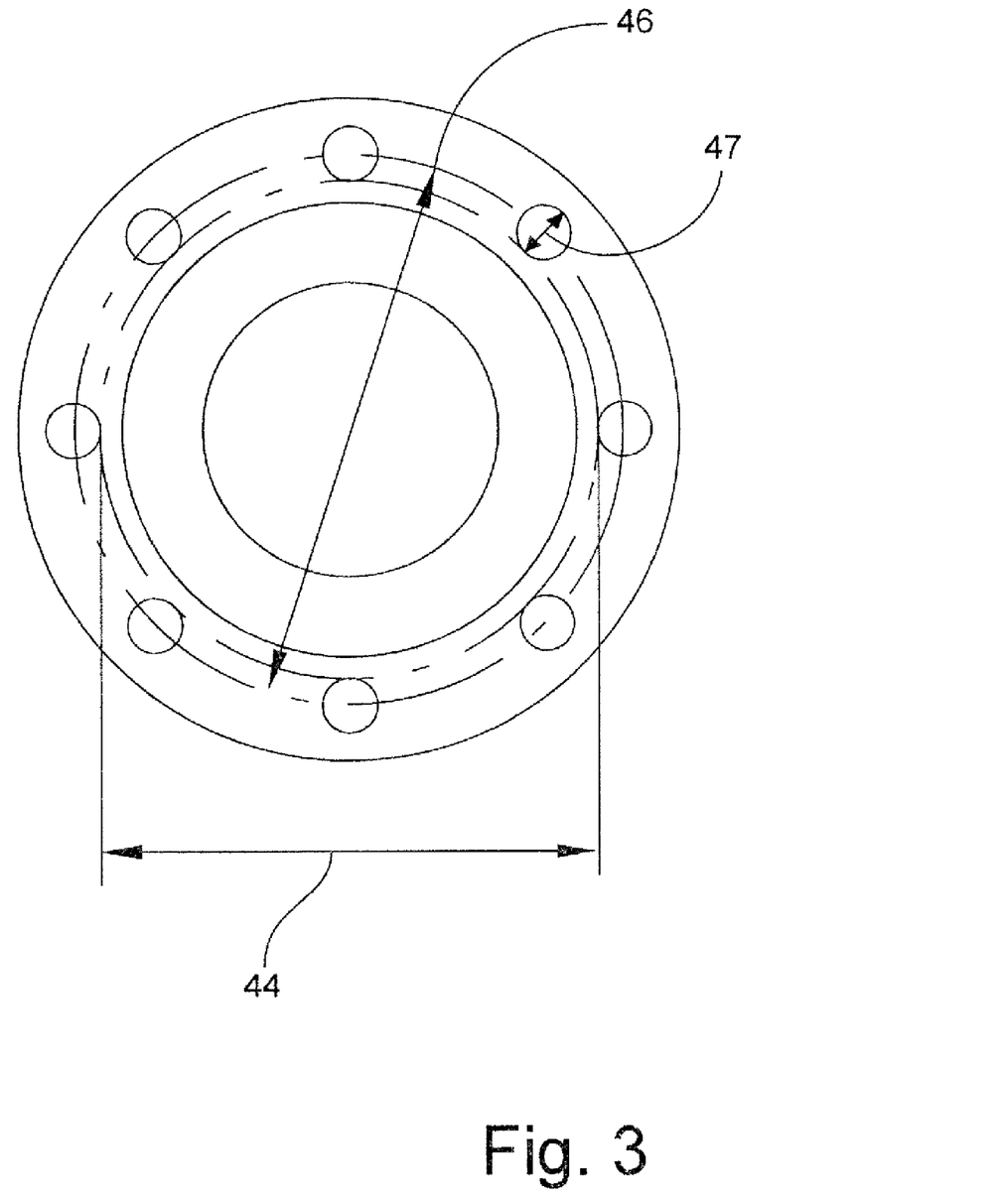
FIG. 3 is a cross-sectional view of the piping system of FIG. 2 with the wafer-shaped hollow fiber module from FIG. 1 installed in-line.

In one embodiment, cylindrical housing 16 may be dimensioned for providing the shape and size of module 14 to allow it to be positioned between two standard bolted flange connections 12 of piping system 10 (see FIGS. 2 and 3). For example, for a 4 inch diameter pipe, housing diameter 44 may be approximately 6.75 inches. This may allow module 14 to be easily installed, replaced or maintained in between the bolts 13 of a standard bolted flange connection 12 adapted to fit a 4 inch diameter pipe 62.

End cap 28 may be united to open end 18 of cylindrical housing 16. See FIG. 1. End cap 28 may be for closing cylindrical housing 16. After stack of membrane mats 34 may be inserted into cylindrical housing 16, end cap 28 may be united to open end 18 of cylindrical housing 16. Preferably, end cap 28 may be united by an air-tight seal to the exterior walls of cylindrical housing 16. Such sealing means may include gluing, welding, spin welding, threading, O-rings, and the like. An outlet port 32 may be included in end cap 28. End cap 28 may also include a second sealing surface 30. In one embodiment, end cap 28 may include an annular groove on the inside for allowing air flow through all of headspace 70.

An inlet port 24 and an outlet port 32 may be included in wafer-shaped hollow fiber module 14. See FIG. 1. Closed end 20 may include inlet port 24 for receiving a fluid into cylindrical housing 16. Circular inlet port 24 may be defined by an opening 25 in closed end 20. End cap 28 may include outlet port 32 for discharging the fluid from cylindrical housing 16. Circular outlet port 32 may be defined by an opening 33 in end cap 28. Inlet port 24 and outlet port 32 may be in communication with each other through internal chamber 40. In combination, inlet port 24 and outlet port 32, may allow a fluid line or stream to be moved through cylindrical housing 16 in internal chamber 40. Inlet port 24 and outlet port 32 may be reversible allowing a fluid line to flow through wafer-shaped module 14 in either direction. Inlet port 24 and outlet port 32 may be openings in closed end 20 and end cap 28, respectively. These openings in closed end 20 and open end 18 may be any shape, including, but not limited to, circular.

The fluid line may be any fluid line, including, but not limited to a liquid line, a gas line, a vacuum line, an ambient air line, a supercritical fluid, or any other fluid line depending on the desired application of module 14. Liquid, or a liquid line, as used herein may be any type of liquid, including, but not limited to: RO Permeate, RO Concentrate, ground water, surface water, deionized water, distilled water, ultrapure water, developer solution, coating solution, urine, blood, chemicals, liquids for human consumption, or any other liquids or mixtures. Gas or a gas line, as used herein may be any type of gas, including, but not limited to: flue gas, vent gas, Ammonia, Argon, Hydrogen Sulfide, Hydrogen Chloride, Chlorine water, $CO_2$, $SO_2$, $NO_2/NO(NO_x)$, Ammonia, $H_2S$, or any other gases or mixtures.

At least one side port 26 may be provided in cylindrical housing 16. See FIGS. 1 and 2. Side ports 26 may be anywhere between open end 18 and closed end 20. Side ports 26 may be in communication with hollow fibers 36 of stack 34 via external chambers 42. Preferably, there should be one side port 26 positioned at the center of every external chamber 42. Additionally, each side port 26 may be provided with a detachable fitting including, but not limited to, quick-connect fittings, threaded fittings, compression fittings, twist-lock fittings, Luer fitting, or other fittings for connection to a vacuum line, gas line, liquid line, or any other type of fluid line. In one embodiment, side ports 26 may be for providing a vacuum or partial vacuum to hollow fibers 36 via external chambers 42. In another embodiment, side ports 26 may be for sweeping a gas through module 14 from one external chamber 42 through hollow fibers 36, to another external chamber 42. In yet another embodiment, side ports 26 may be for providing pressurized gas to hollow fibers 36 via external chamber or chambers 42. In yet another embodiment, side ports 26 may be for moving a liquid through hollow fibers 36 via external chamber or chambers 42.

A first sealing surface 22 may be included on closed end 20. See FIG. 1. First sealing surface 22 may be for providing a surface to seal wafer-shaped hollow fiber module 14 with standard bolted flange connection 12b (it should be understood module 14 is reversible and first sealing surface 22 may be sealed to bolted flange connection 12a or 12b). See FIG. 2. First sealing surface 22 may be any surface on closed end 20 capable of sealing wafer shaped hollow fiber module 14 with standard bolted flange connection 12b, including, but not limited to, a flat surface. This flat surface may be sealed to standard bolted flange connections 12 by any means, including a flat wall or a standard gasket (such as a plastic gasket, a rubber gasket, an o-ring, a paper annular gasket, gel, caulk or the like). In one embodiment, first sealing surface 22 may be defined by a first outside radius 50 and a first inside radius 52. First outside radius 50 may be the radius of cylindrical housing 16 and first inside radius 52 may be the radius of inlet port 24. In one embodiment, first sealing surface 22 may be defined by a difference between first outside radius 50 and first inside radius 52 of at least about 0.1 inches. In a preferred embodiment, first sealing surface 22 may be defined by a difference between first outside radius 50 and first inside radius 52 of at least about 0.188 inches.

A second sealing surface 30 may be included on end cap 28. See FIG. 1. Second sealing surface 30 may be for providing a surface to seal wafer-shaped hollow fiber module 14 with standard bolted flange connection 12a (it should be understood module 14 is reversible and second sealing surface 30 may be sealed to bolted flange connection 12a or 12b). See FIG. 2. In one embodiment, second sealing surface 30 may be the same size as first sealing surface 22 but on the opposite end of wafer-shaped hollow fiber module 14. Second sealing surface 30 may be any surface on end cap 28 capable of sealing wafer shaped hollow fiber module 14 with standard bolted flange connection 12a, including, but not limited to, a flat surface. This flat surface may be sealed to standard bolted flange connections 12 by any means, including a flat wall or a standard gasket (such as a plastic gasket, a rubber gasket, an o-ring, a paper annular gasket, gel, caulk or the like). In one embodiment, second sealing surface 30 may be defined by a second outside radius 56 and a second inside radius 58. Second outside radius 56 may be the radius of end cap 28 and second inside radius 58 may be the radius of outlet port 32. In one embodiment, second sealing surface 30 may be defined by a difference between second outside radius 56 and second inside radius 58 of at least about 0.1 inches. In a preferred embodiment, second sealing surface 30 may be defined by a difference between second outside radius 56 and second inside radius 58 of at least about 0.188 inches.

Stack of membrane mats 34 may be inserted into cylindrical housing 16. See FIG. 1. The stack of membrane mats 34 may be sandwiched between closed end 20 and end cap 28. Potting material 38 may bond stack 34 together and hold stack 34 in place in cylindrical housing 16. The membrane mats of stack 34 may be stacked so that hollow fiber members 36 of each membrane mat are aligned, thus, allowing a gas to be swept through wafer-shaped hollow fiber module 14. The membrane mats of stack 34 may also be stacked so that hollow fiber members 36 of every other membrane mat are perpendicularly aligned allowing a gas to be swept through in two different directions in module 14 or allowing two different gases to be swept through module 14. The membrane mats may be woven, knitted, or otherwise joined together in generally planar structures containing a plurality of joined together hollow fiber members 36. The membrane mats may be stacked substantially perpendicular to the longitudinal axis of cylindrical housing 16. The dimension of the membrane mats of stack 34 may be slightly smaller than cylindrical housing 16 so that, when stack 34 may be inserted into cylindrical housing 16, a headspace 70 may be created between the peripheral edge 68 of stack 34 and the interior wall of cylindrical housing 16 (see FIG. 1). The membrane mats of stack 34 may be cut to any shape, including but not limited to, circular or a double "D" shape.

In accordance with at least one embodiment, the effective stack 34 of membrane mats aspect ratio (the "Effective Stack Aspect Ratio") is defined as the ratio of the effective stack diameter (the diameter inside the potting material or the diameter of the inlet opening, whichever is less) relative to the stack thickness. For example, in accordance with selected embodiments, the Effective Stack Aspect Ratio may be in the range of about 1 to 8, preferably from about 1 to 6, and more preferably from about 1 to 4, most preferably from 1.5 to 3. It being understood that, depending on the specific use of the module, the desired pressure drop, the module manufacturing process, and/or the like, the Effective Stack Aspect Ratio may be larger or smaller.

In accordance with at least certain specific examples, modules 14 may include membrane mat stacks with the following approximate effective stack diameters and stack thicknesses: 1 inch diameter and ½ inch thickness, 2 inch diameter and 4 inch thickness, 3 inch diameter and 1 inch thickness, 4 inch diameter and 1.5 inch thickness, 6 inch diameter and 3 inch thickness, 8 inch diameter and 3 inch thickness, and the like.

Hollow fiber members 36 may be included in stack of membrane mats 34. See FIG. 1. Hollow fiber members 36 may have open ends that communicate with side ports 26 via external chamber or chambers 42. Hollow fiber members 36 may be for communicating between internal chamber 40 and external chamber or chambers 42 allowing, for example, removal of entrained gases from a liquid, debubbling of a liquid, filtering of a liquid, adding a gas to a liquid, humidifying a gas, or the like. In one embodiment, hollow fiber members 36 may extend from internal chamber 40 through potting material 38 into external chamber or chambers 42. Hollow fiber members 36 of stack of membrane mats 34 may be of like materials and properties, or may be of various materials and/or properties. Hollow fiber members 36 may be fibers having a lumen and a wall surrounding the lumen. Hollow fiber members 36 may have solid walls, porous walls, or microporous walls (e.g., symmetric pores, asymmetric pores, skinned membranes and the like). Hollow fiber members 36 may be made of any suitable materials. Such materials include polyolefins (e.g., polyethylene, polypropylene, polybutene, poly methyl pentene), polysulfones (e.g., polysulfone, polyethersulfone, polyarylsulfone), cellulose and its derivations, PVDF, poly phenyl oxide (PPO), PFAA, PTFE, other fluorinated polymers, polyamides, poly ether ether ketone (PEEK), polyether imides (PEI), polyimides, ion-exchange membranes (e.g., Nafion®), etc.

Potting material 38 may be for providing a fluid-tight annular wall, or partial annular walls, within wafer-shaped hollow fiber module 14. See FIG. 1. Potting material 38 may be a fluid-tight annular wall or partial annular walls that divide cylindrical housing 16 into an internal chamber 40 and at least one external chamber 42. The fluid-tight annular wall or partial annular walls defined by potting material 38 may be bonded to the closed end 20 and end cap 28, and may be further continuous or integral between each membrane mat of stack 34. This may allow potting material 38 to distribute the strength of the device to cylindrical housing 16 and end cap 28. Potting material 38 may maintain a fluid-tight engagement between cylindrical housing 16 and stack of membrane mats 34 between closed end 20 and end cap 28. Potting material 38 may be any material, for example, any suitable thermosetting materials or any suitable thermoplastic materials. Exemplary materials for potting material 38 include, but are not limited to, epoxy, polyolefins, and polyurethane.

Internal chamber 40 may be divided by potting material 38 from external chamber or chambers 42 within cylindrical housing 16. See FIG. 1. Internal chamber 40 may be in communication with inlet port 24 and outlet port 32. Internal chamber 40 may be for allowing a fluid line or stream (gas, liquid, air, etc.) to move through stack of membrane mats 34 in wafer-shaped hollow fiber module 14. Internal chamber 40 may have a diameter which is equal to the diameter of the surrounding potting material 38.

At least one external chamber 42 may be included in cylindrical housing 16. See FIG. 1. External chamber or chambers 42 may be for providing a space for the peripheral edge 68 of stack of membrane mats 34 where the ends of hollow fiber members 36 may remain open and communicate with side ports 26. A headspace 70 may be included in external chamber or chambers 42. External chambers 42 may allow hollow fiber members 36 to communicate from headspace 70 to side ports 26.

Headspace 70 may be included within external chambers 42. See FIG. 1. Headspace 70 may be defined by the space between the peripheral walls of stack of membrane mats 34 and the interior surface of cylindrical housing 16. Headspace 70 may allow communication between side ports 26 and the open ends of the hollow fiber members 36 of the stack of membrane mats 34. In one embodiment, headspace 70 may include a plurality of baffles for directing fluid flow through headspace 70.

Wafer-shaped hollow fiber module 14 can be inserted as a short spool piece (known in the art as a wafer) between two standard bolted flange connections 12. See FIG. 2. Inserting wafer-shaped hollow fiber module 14 between two standard bolted flange connections 12 may allow module 14 to be easily installed, replaced, or maintained in-line with a new or existing piping system 10. For purposes of this invention, module 14 being installed, replaced or maintained "in-line" with new or existing piping systems means that module 14 is installed directly in the flow path of the conduits of the piping system. Standard bolted flange connections 12 may be connected to a conduit 62 to form piping system 10.

Piping system 10 may be any new or existing piping system, including, but not limited to, a pipe system, a duct system, a tube system, or any other conduit system of the like. Piping system 10 may include any known piping system components. In one embodiment, piping system 10 may include wafer-shaped hollow fiber module 14 installed between two standard bolted flange connections 12. See FIGS. 2 and 3. Piping system 10 may include standard bolted flange connections 12 being connected to a conduit 62. Conduit 62 may be any conduit, including, but not limited to, a pipe, a duct, a tube, or any other conduit of the like. Piping system 10 may have any size conduit. In one embodiment, piping system 10 may have a conduit with a diameter between ½ inch and 24 inches.

Standard bolted flange connections 12 may be included in piping system 10. See FIG. 2. Standard bolted flange connections 12 may be for allowing wafer-shaped hollow fiber module 14 to be used in-line with any new or existing piping system. Standard bolted flange connections 12 may be any standard bolted flange connections capable of allowing wafer-shaped hollow fiber module 14 to be used in-line with any new or existing piping system, including, but not limited to, any size, any material and any shape bolted flange connections. In one embodiment, standard bolted flange connections 12 may be Japanese Industrial Standard ("JIS") bolted flange connections. In another embodiment, standard bolted flange connections 12 may be American National Standards Institute ("ANSI") bolted flange connections by the American Standard Association ("ASA"). The two standard bolted flange connections 12 (represented by 12a and 12b in FIG. 2) may be connected by a plurality of bolts 13 and may be sealed to both sides of wafer-shaped module 14 by a first seal 48 and a second seal 54.

Plurality of bolts 13 may be included in standard bolted flange connections 12. See FIGS. 2 and 3. Bolts 13 may be for connecting bolted flange connections 12 on each side of wafer-shaped module 14. Plurality of bolts 13 may include any number of bolts, including, but not limited to, 4 bolts, 5 bolts, 6 bolts, 7 bolts, 8 bolts, 12 bolts, 16 bolts, or 20 bolts. Bolts 13 may have any diameter. Bolts 13 may have a diameter slightly smaller than a diameter 47 of the associated bolt holes. See FIG. 3. For example, bolts 13 may have a diameter of about ⅛ inch less than bolt hole diameter 47. Bolt hole diameter 47 may be any distance. In order to install module 14 between two standard bolted flange connections 12, at least half of bolts 13 may be removed and the remaining bolts may be loosened to allow module 14 to be positioned between the two flange connections 12. Once module 14 is positioned between the two flange connections 12, the removed bolts 13 may be inserted back in their respective bolt holes. Bolts 13 may then be tightened to create a seal between standard bolted flange connections 12 and wafer-shaped module 14.

Plurality of bolts 13 may have a bolt circle diameter 46 defined by the distance from the center of standard bolted flange connection 12 to the center of each bolt 13. The inside portions of bolts 13 may position wafer-shaped hollow fiber module 14 in between standard bolted flange connections 12. As a result, housing diameter 44 should be approximate to the difference between bolt circle diameter 46 and bolt hole diameter 47. In one embodiment, housing diameter 44 may be slightly smaller than the difference between bolt circle diameter 46 and bolt hole diameter 47. This may allow module 14 to be more easily installed in between plurality of bolts 13. In another embodiment, housing diameter 44 may be approximately equal to the difference between bolt circle diameter 46 and bolt hole diameter 47. In another embodiment, housing diameter 44 may be approximately equal to the provided tolerance between bolt circle diameter 46 and bolt hole diameter 47. In yet another embodiment, housing diameter 44 may be about 0.015 inches smaller than the difference between bolt circle diameter 46 and bolt hole diameter 47.

The table below gives examples of approximate sizes for the diameter of cylindrical housing 16 based on what diameter piping system module 14 is to be installed in-line with (see FIG. 3):

| Piping Diameter (in.) | Bolt Circle Diameter (in.) | Bolt hole diameter (in.) | No. of Bolts | Housing Diameter = Bolt Circle Diameter − Bolt hole diameter (in.) |
|---|---|---|---|---|
| ½ | 2.38 | 0.62 | 4 | 1.76 |
| ¾ | 2.75 | 0.62 | 4 | 2.13 |
| 1 | 3.12 | 0.62 | 4 | 2.5 |
| 1¼ | 3.5 | 0.62 | 4 | 2.88 |
| 1½ | 3.88 | 0.62 | 4 | 3.26 |
| 2 | 4.75 | 0.75 | 4 | 4 |
| 2½ | 5.5 | 0.75 | 4 | 4.75 |
| 3 | 6 | 0.75 | 4 | 5.25 |
| 3½ | 7 | 0.75 | 8 | 6.25 |
| 4 | 7.5 | 0.75 | 8 | 6.75 |
| 5 | 8.5 | 0.88 | 8 | 7.62 |
| 6 | 9.5 | 0.88 | 8 | 8.62 |
| 8 | 11.75 | 0.88 | 8 | 10.87 |
| 10 | 14.25 | 1.00 | 12 | 13.25 |
| 12 | 17 | 1.00 | 12 | 16.00 |
| 14 | 18.75 | 1.12 | 12 | 17.63 |
| 16 | 21.25 | 1.12 | 16 | 20.13 |
| 18 | 22.75 | 1.25 | 16 | 21.5 |
| 20 | 25 | 1.25 | 20 | 23.75 |
| 22 | 27.25 | 1.38 | 20 | 25.87 |
| 24 | 29.5 | 1.38 | 20 | 28.12 |

These numbers in the above chart are based on ANSI B16.5 Class 150 Forged Flanges. However, these numbers are just representative of the calculations to determine housing diameter 44 and the invention is not limited to these particular bolted flange connections.

First seal 48 and second seal 54 may be included in piping system 10. See FIG. 2. First seal 48 may seal bolted flange connection 12a to second sealing surface 30 of end cap 28 and second seal 54 may seal bolted flange connection 12b to first sealing surface 22 of closed end 20, or vice versa. First seal 48 and second seal 54 may be any type of seals adapted to seal bolted flange connections 12 to wafer-shaped module 14, including, but not limited to, flat surfaces or standard bolted flange gaskets.

Wafer-shaped hollow fiber module 14 may provide several performance enhancements over other devices known in the art for removing entrained gases from liquids or debubbling liquids. These advantages include, but are not limited to: minimal shell side pressure drop due to very small transverse flow distance and maximum cross sectional flow area; module 14 may be easily installed, replaced, or maintained into new or existing piping systems with minimal reconfiguration (most existing designs are large and often involve complicated piping modifications); low cost manufacturing due to the known manufacturing technology with membrane mats (see, for example, US Patent Publication Nos. 2006/0163140 and 2007/0278145); and the design is stackable (in other words, you can put several wafers back to back or back to front in series).

For example, because of its design, wafer-shaped hollow fiber module 14 may be installed and sealed between two standard bolted flange connections 12. The wafer shape of module 14 allows it to be easily installed (or later replaced or maintained) in-line with new or existing piping systems, like piping system 10. Also because of its wafer-shaped design, with a relatively low profile compared to its diameter, hollow fiber module 14 may provide a less restrictive flow path from inlet port 24 to outlet port 32, which results in less pressure drop in the fluid moving through internal chamber 40. This pressure drop is represented by arrow 66 in FIG. 2. The less pressure drop the fluid experiences moving through internal chamber 40, the less effect wafer-shaped module 14 may have on the fluid line in piping system 10. In one embodiment, pressure drop 66 through internal chamber 40, as measured by the pressure drop between the two standard bolted flange connections 12, may be less than about 1.5 psi at a gas flow rate of 10 Standard Liters/minute for an internal chamber 40 with approximately a 4 inch diameter. In a preferred embodiment, the pressure drop through internal chamber 40 between the two standard bolted flange connections 12, may be less than about 0.1 psi at a gas flow rate of 10 Standard Liters/minute for an internal chamber 40 with approximately a 4 inch diameter. In one embodiment, the pressure drop (dP) for a sodium chloride brine solution with a 1.0 liters/minute flow rate may be less than 1.0 psi for a module 14 with an internal chamber 40 with approximately a 4 inch diameter and a stack 34 of membrane mats 34 with approximately a 2 inch thickness. In one embodiment, the pressure drop for water may be less than 1.5 psi for a 10 liters/minute flow through an internal chamber 40 with a 4 inch diameter. As a result of these enhanced performances, wafer-shaped hollow fiber module 14 may be easily positioned (installed, replaced or maintained) in-line with new or existing piping systems.

Wafer-shaped hollow fiber module 14 may be ideally suited for a number of gas transfer applications that require gas treating (as opposed to water treating). Examples include, but are not limited to: $CO_2$, $SO_2$, $NO_2/NO(NO_x)$, Ammonia, $H_2S$, (or any other undesirable species) removal from Air or Biogas in a scrubbing process using chemical absorbents or non-chemical absorbents; adding humidity or removing humidity from Air or Process gases by means of water vapor transfer between gas and liquid phases. In both examples of gas treating applications listed above, the gas phase flows on the shell side (the outside) and the liquid flows through the inside of hollow fibers 36. Because of the essentially negligible pressure drop on the shell side, it may be possible to install these devices 'in-line' without a need for upgrading existing air-moving equipment (blowers or compressors).

The instant wafer-shaped hollow fiber module 14 is not limited to gas streams. It will also work very effectively for degassing and gassing applications of liquid streams, such as in-line carbonation of beverages, in-line pH adjustment of water, and stripping of dissolved gases from aqueous solutions. In these applications water will flow on the shell side, and the gas phase (at elevated pressures or under vacuum), will flow through the lumen side.

Figure 6A:
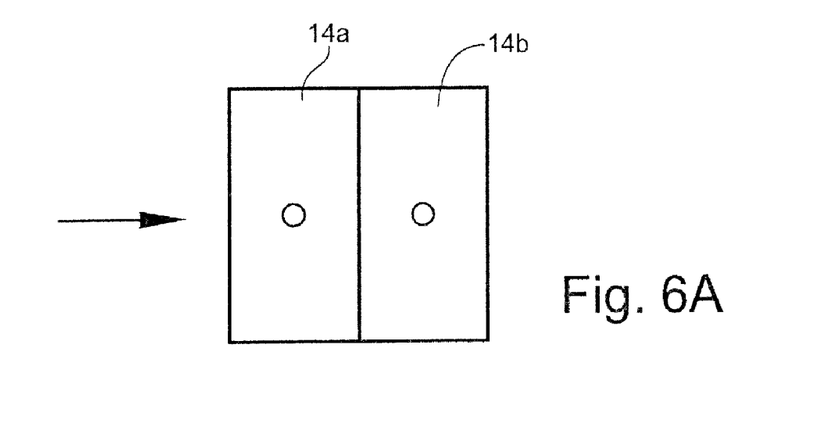
FIGS. 6A-6C are schematic diagrams of aligned stacks of modules in accordance with selected embodiments of the instant invention.
Figure 6B:
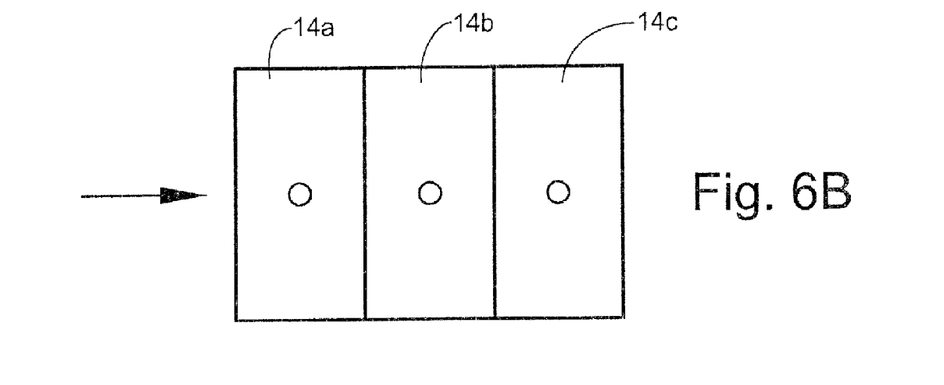
Figure 6C:
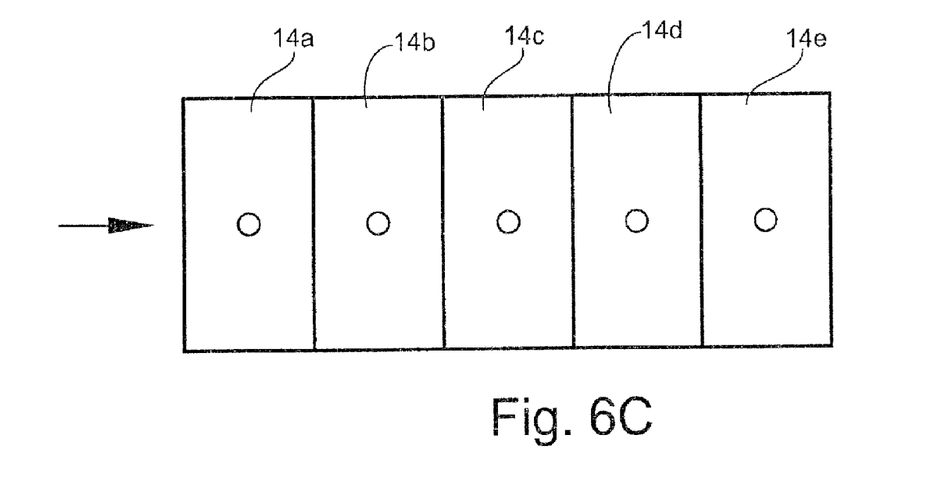

With reference to FIG. 6, another opportunity for this device is to stack multiple such modules 14 end to end, each with the same or different fiber types. For example, one wafer-shaped module 14 could selectively remove one component from a gas stream, a second could selectively remove a different component, and a third could be used for heat exchanging, filtration, and so forth. FIG. 6A shows two modules, 6B shows three modules, and 6C shows five modules. As would be understood, longer bolts may be required and gaskets may be used therebetween.

In operation, wafer-shaped hollow fiber module 14 may be used in-line with a new or existing piping system 10 to remove entrained gases from a fluid, debubble a fluid, filter a fluid, add gas to a liquid, or humidify a fluid. For example, a first fluid line (i.e., gas, liquid, air, etc.) may be introduced into wafer-shaped hollow fiber module 14 via inlet port 24 and exit via outlet port 32 (or vice versa). As the fluid travels over the external surfaces of the hollow fiber members 36, gases may be removed (entrained gases or bubbles) or added via a second fluid line (gas, liquid, air, vacuum, etc.), and unwanted materials may be blocked (filtration). Depending upon the use of the module, the characteristics of the hollow fibers 36 may change (different types of hollow fibers may be used and/or different arrangements of hollow fibers may be used).

In the removal of entrained gases mode, debubbling mode and or filtering mode, as the liquid travels through internal chamber 40, the gases may be removed by passing through the wall of the hollow fiber members 36, into the lumen, and out through side ports 26 by way of headspace 70 and external chamber 42. Removal of the gases may be facilitated by application of a vacuum or partial vacuum by way of side ports 26. Removal of the gases may also be facilitated by sweeping a gas through wafer-shaped hollow fiber module 14 by way of side ports 26. Gases that may be swept through wafer-shaped module 14 by way of side ports 26 to facilitate removal of gases from a liquid include, but are not limited to, carbon dioxide, nitrogen, oxygen, etc. When wafer-shaped module 14 may have more than one side port 26, ambient air may also be used in facilitating removal of gases from a liquid. One side port 26 may be left open while the other side ports 26 are hooked up to a vacuum line. Thus, when the vacuum is applied, ambient air from outside of wafer-shaped module 14 may be swept through wafer-shaped module 14. Sweeping a gas through wafer-shaped module 14 may also facilitate removal of any condensation buildup in wafer-shaped module 14. In at least one filtration mode, contaminated fluid is introduced via inlet port 24 (or outlet port 32) and exits via side ports 26 (or vice versa). Fluid travels through the hollow fiber members 36 from internal chamber 40 to the external chamber or chambers 42 where the walls of the hollow fiber members 36 block contaminants.

Alternatively, in the adding a gas to a liquid mode, gases (such as carbon dioxide, nitrogen, oxygen, etc.) may be introduced into a liquid. As the liquid flows through internal chamber 40 via inlet port 24 or outlet port 32, the gas may be introduced through side ports 26 at a lower pressure than the liquid in internal chamber 40. The lower pressure allows the gas to absorb into the liquid, which may reduce bubbling of the gas in the liquid. Gas may then move from side ports 26 to headspace 70 and into hollow fiber lumens and out through the wall of the hollow fiber members 36 into the liquid.

In the removal of gases, like $CO_2$, $SO_2$, $NO_2$ and/or other undesirable species from air or biogas mode, as the air or biogas enters through internal chamber 40, the $CO_2$, $SO_2$, $NO_2$ and/or other undesirable species may be removed selectively by passing through the wall of the hollow fiber members 36, into an absorbent liquid in the lumen, with the liquid flowing out through side ports 26 by way of headspace 70 and external chamber 42. Removal of the $CO_2$, $SO_2$, $NO_2$ and/or other undesirable species may be facilitated if the gas species chemically reacts with the liquid.

In the humidifying or dehumidifying a fluid stream mode (gas or liquid), as the fluid stream enters through internal chamber 40, the fluid stream may be humidified or dehumidified by passing a pressurized liquid through hollow fiber members 36 via side ports 26 and allowing vapor from the liquid to pass through the wall of the hollow fiber members 36, into internal chamber 40. As should be understood, the treatment of one or more fluid streams may also include such processes as osmosis, homeostasis, equilibrium, adding solvent, dissolving one fluid into another, absorption, reducing the concentration of a fluid (by for example, adding water), and any other such processes.

Figure 4:
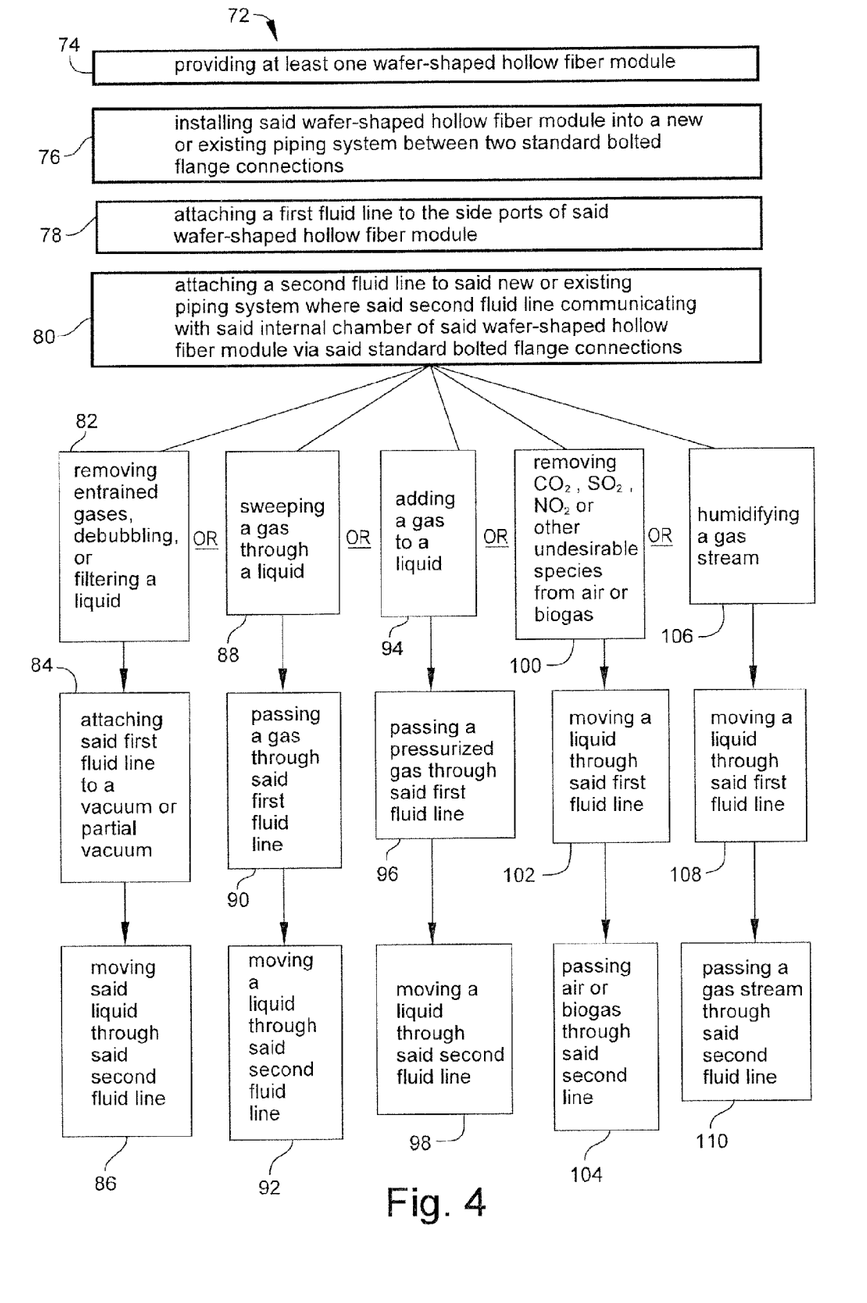
FIG. 4 is a diagram of one embodiment of a method of treating at least one fluid line according to at least one embodiment of the instant invention.

As shown in FIG. 4 and in at least one embodiment, a method 72 of treating a fluid line may be included in the instant invention. Method 72 may include the steps of: a step 74 of providing at least one wafer-shaped hollow fiber module 14: a step 76 of installing wafer-shaped hollow fiber module 14 into piping system 10 between two standard bolted flange connections 12; a step 78 of attaching side ports 26 of wafer-shaped hollow fiber module 14 to a first fluid stream; and a step 80 of passing a second fluid line or stream through internal chamber 40 of wafer-shaped hollow fiber module 14 via piping system 10.

Step 76 of installing wafer-shaped hollow fiber module 14 into piping system 10 between two standard bolted flange connections 12 may be included in method 72. See FIG. 3. Step 76 may include any steps for installing wafer-shaped hollow fiber module 14 between two standard bolted flange connections 12. Step 76 could be installing a new wafer-shaped hollow fiber module 14 or it could be replacing or maintaining a current module 14. In one embodiment, step 76 may include the steps of: inserting no more than half of bolts 13 into their respective holes on two standard bolted flange connections 12 (must be adjacent holes so that at least half of the two standard bolted flange connections 12 is open to allow module 14 to be inserted); inserting module 14 in between standard bolted flange connections 12; utilizing the inserted bolts 13 to position module 14; inserting the remaining bolts 13; and tightening bolts 13, thereby, sealing module 14 in between two standard bolted flange connections 12.

A step 82 of removing entrained gases, debubbling or filtering a liquid may be included in one embodiment of method 72 of treating a fluid line with wafer-shaped module 14. See FIG. 4. Step 82 may include any steps for removing entrained gases, debubbling or filtering a liquid, including, but not limited to, the steps of: a step 84 of attaching the first fluid line to a vacuum or partial vacuum; and a step 86 of moving the liquid through the second fluid line; whereby, removal of entrained gases, debubbling, or filtering of the liquid is performed via the vacuum or partial vacuum on side ports 26.

A step 88 of sweeping a gas through a liquid may be included in one embodiment of method 72 of treating a fluid line with wafer-shaped hollow fiber module 14. See FIG. 4. Step 88 may include any steps for sweeping a gas through a liquid, including, but not limited to, a step 90 of passing a gas through the first fluid line from one side port 26 through hollow fibers 36 and out of the other side port 26; and a step 92 of moving a liquid through the second fluid line; whereby, a gas is swept through the liquid by the gas flowing through hollow fibers 36. In this embodiment, wafer-shaped hollow fiber module 14 may comprise two side ports 26 in communication with two separate external chambers 42.

A step 94 of adding a gas to a liquid may be included in one embodiment of method 72 of treating a fluid line with wafer-shaped hollow fiber module 14. See FIG. 4. Step 94 may include any steps for adding a gas to a liquid, including, but not limited to, the steps of: a step 96 of passing a pressurized gas through the first fluid line from one side port 26 through hollow fibers 36 and out of the other side port 26; and a step 98 of moving a liquid through the second fluid line; whereby the pressurized gas is added to the liquid by the gas flowing through hollow fibers 36.

A step 100 of removing $CO_2$, $SO_2$, $NO_2$ and/or other undesirable species may be included in one embodiment of method 72 of treating a fluid line with wafer-shaped module 14. See FIG. 4. Step 100 may include any steps for removing $CO_2$, $SO_2$, $NO_2$ and/or other undesirable species, including, but not limited to, the steps of: a step 102 of moving a liquid through a first fluid line via side ports 26; and a step 104 of passing air or biogas through a second line via inlet port 24 and outlet port 32; whereby, $CO_2$, $SO_2$, $NO_2$ or other undesirable species may be removed from the air or biogas via the liquid through hollow fibers 36.

A step 106 of humidifying or dehumidifying a fluid stream may be included in one embodiment of method 72 of treating a fluid line with wafer-shaped hollow fiber module 14. See FIG. 4. Step 106 may include any steps for humidifying or dehumidifying a fluid stream, including, but not limited to, the steps of: a step 108 of moving a pressurized liquid through a first fluid line via said side ports 26; and a step 110 of passing a fluid stream through a second fluid line via said inlet port 24 and said outlet port 32; whereby, the fluid stream may be humidified or dehumidified via transfer of water vapor between the gas stream and the pressurized liquid moving through hollow fibers 36.

Wafer-shaped hollow fiber module 14 may be preferably manufactured as follows:

Wafer-shaped hollow fiber module 14 can be produced using liquid-on-liquid potting technology (discussed in detail below) or radial potting followed by machining for larger devices as commonly known in the art.

Referring to FIG. 1, cylindrical housing 16 may be filled with stack of membrane mats 34. The membrane mats of stack 34 may be dimensioned to almost fill the cavity of cylindrical housing 16 and may be stacked so that they are substantially perpendicular to the longitudinal axis of cylindrical housing 16. Cylindrical housing 16 and end cap 28 may be made of any material. Such materials include polyolefins, polyvinyl chloride, ABS, Noryl®, PVDF, PFA, or other fluorinated plastics, fiber-reinforced plastics, polysulfones, polycarbonates, polyamides, metals, etc.

The membrane mats of stack 34 may be bonded, welded, woven, nonwoven, knitted, or otherwise joined together in generally planar structures containing a plurality of joined together hollow fiber members 36, also known as a disc module construction. The hollow fiber members 36 of the membrane mats may be of like materials and properties, or may be of various materials and/or properties. These membrane mats of stack 34 may be cut from a larger fabric to the desired size and shape to fit within cylindrical housing 16. Cutting may be accomplished by die cutting, ultrasonic cutting, knife cutting (e.g., hot), etc.

Hollow fiber members 36 may be fibers having a lumen and a wall surrounding the lumen. The wall may have an exterior surface or shell. Hollow fiber members 36 may have solid walls, porous walls, or microporous walls (e.g., symmetric pores, asymmetric pores, skinned membranes and the like). These hollow fibers may be made of any material. Such materials include polyolefins (e.g., polyethylene, polypropylene, polybutene, poly methyl pentene), polysulfones (e.g., polysulfone, polyethersulfone, polyarylsulfone), cellulose and its derivations, PVDF, poly phenyl oxide (PPO), PFAA, PTFE, other fluorinated polymers, polyamides, polyether imides (PEI), polyimides, ion-exchange membranes (e.g., Nafion®), etc.

End cap 28 may be placed over open end 18 of cylindrical housing 16 after stack of membrane mats 34 may be inserted into cylindrical housing 16. End cap 28 may be united to cylindrical housing 16. This uniting may be accomplished by any means, for example, gluing, welding, or threading. End cap 28 may be joined along its contact surface with cylindrical housing 16. The cylindrical housing 16 and end cap 28 may sandwich the stack of membrane mats 34 and hold stack 34 in place during the next operation of the manufacture process.

Before spinning, all side ports 26 may be plugged. Because centrifugal forces may force the fluids to the exterior of cylindrical housing 16, where side ports 26 are located, plugging of side ports 26 may be done to maintain the fluids in cylindrical housing 16 when the housing is spun in the following steps. Plugging of side ports 26 may be done by any device, including but not limited to, a cork, a plug, a stopper, a cap, etc. Alternatively, the side ports may be added to housing 16 following addition of the potting material, by, for example, drilling and tapping threaded openings.

The cylindrical housing 16 and end cap 28 may be mounted via outlet port 32 or inlet port 24 onto a device that can spin the wafer-shaped module 14 about the center longitudinal axis of cylindrical housing 16.

During spinning, a boundary fluid is introduced into either outlet port 32 or inlet port 24. The boundary fluid, by action of centrifugal force, runs to the interior wall of cylindrical housing 16 thereby forming a boundary wall or partial boundary walls (depending on the internal shape of cylindrical housing 16). The boundary wall may provide a space for the peripheral edge 68 of stack of membrane mats 34 (external chambers 42 and headspace 70), thus, keeping the ends of hollow fiber members 36 open through the potting steps of the manufacturing process.

Potting material 38 may be introduced into either outlet port 32 or inlet port 24 after the boundary fluid is inserted. The potting material 38, by action of centrifugal forces, runs to the boundary fluid on the interior walls of cylindrical housing 16. Because the boundary fluid may be inert to potting material 38 and may be denser than potting material 38, potting material 38 thereby forms an annular ring or partial annular ring (depending on the internal shape of housing 16) against the boundary fluid wall. Spinning is preferably stopped when potting material 38 has had sufficient time to solidify to a point that it will no longer run or substantially run (i.e., retains or substantially retains the shape of the annular wall).

Potting material 38 may be any material, for example, thermosetting or thermoplastic materials. These materials are chosen with the following exemplary considerations: bond strength to the hollow fiber members 36, cylindrical housing 16 and end cap 28, mechanical strength, and chemical resistance. Exemplary materials for potting material 38 include, but are not limited to, epoxy and polyolefins.

The foregoing spinning step may be further illustrated as follows, it being understood that the invention is not so limited: Cylindrical housing 16 may be spun horizontally. Spinning speeds may be about 150-5000 rpm (depending upon, for example, potting viscosity). If cure is performed at ambient temperatures, spinning till substantially no flow could take up to as much as 24 hours or more; but, if cure is at higher temperatures, then cure times may be shortened, for example at 50° C., spinning time may be dropped to about 2 hours, and at 65° C., spinning time may be dropped to about 0.5-0.75 hours.

After potting material 38 may be cured, side ports 26 may be opened. This step allows the boundary fluid to be emptied or removed. Emptying of the boundary fluid may be facilitated by spinning cylindrical housing 16 as in the previous step after side ports 26 are opened. Once the boundary fluid is emptied, wafer-shaped hollow fiber module 14 may be in its final form.

This liquid-on-liquid process (potting material-on-boundary fluid) described above may eliminate the need to machine the embedded stacks after potting and may eliminate any additional assembly steps. Thus, this process may significantly reduce the time and costs of manufacturing compared to the radial potting followed by machining method known in the art. However, the instant invention could also be made by the radial potting followed by machining method.

Figure 5:
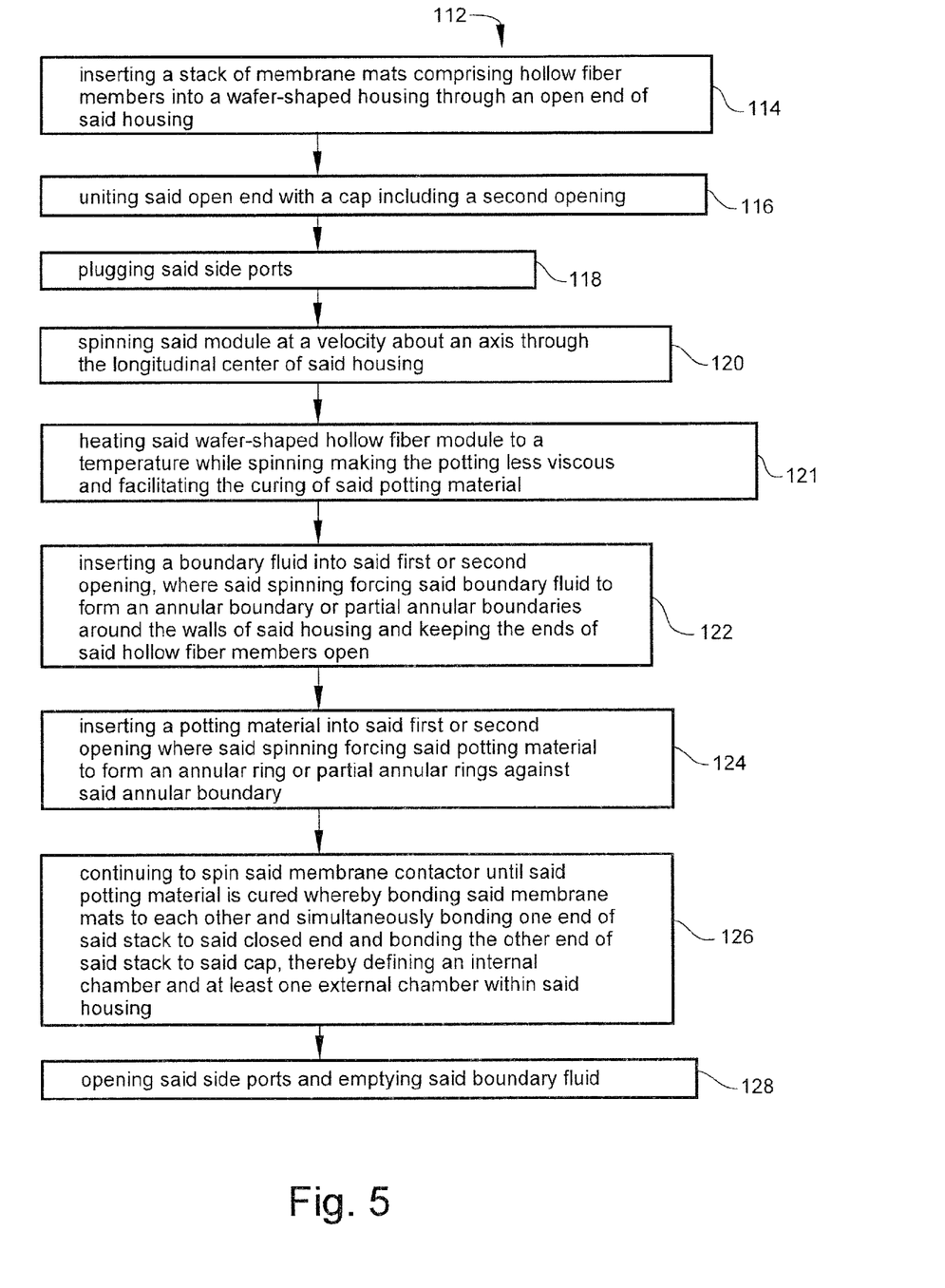
FIG. 5 is a diagram of one embodiment of a method of manufacturing the wafer-shaped hollow fiber module according to at least one embodiment of the instant invention.

As shown in FIG. 5, and in accordance with one embodiment, a method 112 of making wafer-shaped hollow fiber module 14 may be included in the instant invention. Method 112 may include any steps for making wafer-shaped hollow fiber module 14. In one embodiment, method 112 may include the steps of: a step 114 of inserting stack of membrane mats 34 into cylindrical housing 16 through open end 18; a step 116 of uniting open end 18 with end cap 28; a step 118 of plugging side ports 26; a step 120 of spinning module 14 at a velocity about an axis through the longitudinal center of cylindrical housing 16; an optional step 121 of heating module 14 to a temperature while spinning making potting material 38 less viscous and facilitating the curing of potting material 38; a step 122 of inserting a boundary fluid into inlet port 24 or outlet port 32, where the spinning forcing said boundary fluid to form an annular boundary or partial annular boundaries around the walls of cylindrical housing 16 and keeping the ends of hollow fiber members 36 open; a step 124 of inserting potting material 38 into inlet port 24 or outlet port 32, where the spinning forcing potting material 38 to form an annular ring or partial annular rings against the annular boundary; a step 126 of continuing to spin module 14 until potting material 38 is cured whereby bonding membrane mats of stack 34 to each other and simultaneously bonding one end of stack 34 to closed end 20 and bonding the other end of stack 34 to end cap 28, thereby defining an internal chamber 40 and at least one external chamber 42 within cylindrical housing 16; and a step 128 of opening side ports 26 and emptying or removing the boundary fluid.

In one embodiment of method 112, cylindrical housing 16 may have a cylindrical internal shape forcing potting material 38 to define one continuous external chamber 42 around internal chamber 40. In another embodiment of method 112, cylindrical housing 16 may have a Double 'D' internal shape forcing potting material 38 to define two external chambers 42 around internal chamber 40.

The instant invention may be embodied in other forms without departing from the spirit and the essential attributes thereof, and, accordingly, reference should be made to the appended claims, rather than to the foregoing specification, as indicated in the scope of the invention. For example, module 14 may include a cylindrical housing and two end caps with one end cap defining the inlet 24 and the other defining the outlet 32.

We claim:

1. A piping system including:
   two standard bolted flange connections; and
   at least one wafer-shaped hollow fiber module being sealed between said two standard bolted flange connections;
   said two standard bolted flange connections being connected to each other by a plurality of bolts where said wafer shaped hollow fiber module being positioned between said two standard bolted flange connections and in between said plurality of bolts;
   said wafer shaped hollow fiber module comprising:
   a cylindrical housing having an open end and a closed end;
   said closed end having a first sealing surface and an inlet port;
   at least one side port through said cylindrical housing;
   an end cap united to said open end;
   said end cap having a second sealing surface and an outlet port;
   a stack of membrane mats within said cylindrical housing comprising a plurality of hollow fibers;
   a potting material bonding the membrane mats of said stack to each other and simultaneously bonding one end of said stack to said closed end of said cylindrical housing and bonding the other end of said stack to said end cap, thereby defining an internal chamber and at least one external chamber within said housing; and
   said inlet port and said outlet port being in communication with said internal chamber.

2. The piping system of claim 1 wherein said piping system further including:
   a housing diameter defined by the diameter of said cylindrical housing;

a bolt circle diameter defined by the diameter from the center of said bolted flange connections to the center of each said bolt; and a bolt hole diameter defined by each bolt hole;

where said housing diameter being approximate to the difference between said bolt circle diameter and said bolt hole diameter.

3. The piping system of claim 2 wherein said housing diameter being slightly smaller than the difference between said bolt circle diameter and said bolt hole diameter.

4. The piping system of claim 1 further including a first seal sealing said first sealing surface to one of the bolted flange connections;

said first sealing surface having a first outside radius defined by said cylindrical housing and a first inside radius defined by said inlet port, where the difference between said first outside radius and said first inside radius being at least 0.1 inches; and a second seal sealing said second sealing surface to the other bolted flange connection;

said second sealing surface having a second outside radius defined by said end cap and a second inside radius defined by said outlet port, where the difference between said second outside radius and said second inside radius being at least 0.1 inches.

5. The piping system of claim 1 wherein said two standard bolted flange connections being connected in-line with a conduit being a pipe, a duct, a tube, or any conduit of the like.

6. The piping system of claim 1 wherein said internal chamber of said wafer-shaped hollow fiber module creating a pressure drop between said two standard bolt flanges of less than 1.5 psi at a gas flow rate of 10 liters/minute, where said internal chamber having a diameter of 4 inches.

7. A wafer-shaped hollow fiber module comprising:

a cylindrical housing having an open end and a closed end;

said closed end having a first sealing surface and an inlet port;

said first sealing surface having a first outside radius defined by said cylindrical housing and a first inside radius defined by said inlet port, where the difference between said first outside radius and said first inside radius being at least 0.1 inches;

at least one side port through said cylindrical housing;

an end cap united to said open end;

said end cap having a second sealing surface and an outlet port;

said second sealing surface having a second outside radius defined by said end cap and a second inside radius defined by said outlet port, where the difference between said second outside radius and said second inside radius being at least 0.1 inches;

a stack of membrane mats within said cylindrical housing comprising a plurality of hollow fiber membranes;

a potting material bonding the membrane mats of said stack to each other and simultaneously bonding one end of said stack to said closed end of said cylindrical housing and bonding the other end of said stack to said end cap, thereby defining an internal chamber and at least one external chamber within said housing; and said inlet port and said outlet port being in communication with said internal chamber;

whereby, said wafer-shaped hollow fiber module being adapted to work in-line with a conduit via two standard bolted flange connections;

wherein said two standard bolted flange connections being connected to each other by a plurality of bolts where said wafer shaped hollow fiber module being positioned between said two standard bolted flange connections and in between said plurality of bolts.

8. The wafer-shaped hollow fiber module of claim 7 further including:

a housing diameter defined by the diameter of said cylindrical housing;

a bolt circle diameter defined by the diameter from the center of said bolted flange connections to the center of each said bolt; and a bolt hole diameter defined by each bolt hole;

where said housing diameter being approximate to the difference between said bolt circle diameter and said bolt hole diameter.

9. The wafer-shaped hollow fiber module of claim 8 where said housing diameter being approximately equal to the difference between said bolt circle diameter and said bolt hole diameter.

10. The wafer-shaped hollow fiber module of claim 7 where said stack of membrane mats including:

being positioned within said housing where each said membrane mat being stacked substantially perpendicular to the longitudinal axis of said housing;

being stacked so that a peripheral edge of each said membrane mat is aligned with said peripheral edge of the membrane mat below it;

being dimensioned slightly smaller than said cylindrical housing so that when stacked and inserted into said housing a headspace is created between said peripheral edges of said mats and said housing; and said hollow fibers extending from said internal chamber through said potting material into said external chambers.

11. The wafer-shaped hollow fiber module of claim 8 having:

one said side port and one said external chamber;

said one external chamber continuously surrounds said internal chamber allowing said one side port to be in communication with said one external chamber; and said cylindrical housing having a cylindrical internal shape.

12. The wafer-shaped hollow fiber module of claim 7 comprising:

two side ports on opposite sides of said cylindrical housing; and two external chambers separated by said potting material allowing a gas to be swept through said membrane contactor;

one of said side ports communicating with one of said external chambers and the other side port communicating with the other external chamber; and said cylindrical housing having a Double 'D' internal shape.

13. The wafer-shaped hollow fiber module of claim 7, wherein said module is adapted to be used alone or as one of a plurality of such modules stacked end to end.

* * * * *